(12) United States Patent
Choudhury et al.

(10) Patent No.: US 7,563,532 B2
(45) Date of Patent: Jul. 21, 2009

(54) TRIFLUOROSTYRENE CONTAINING COMPOUNDS, AND THEIR USE IN POLYMER ELECTROLYTE MEMBRANES

(75) Inventors: Biswajit Choudhury, Kingston (CA); Mark Gerrit Roelofs, Hockessin, DE (US); Zhen-Yu Yang, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 432 days.

(21) Appl. No.: 10/570,024

(22) PCT Filed: Jun. 25, 2004

(86) PCT No.: PCT/US2004/020704

§ 371 (c)(1),
(2), (4) Date: Feb. 28, 2006

(87) PCT Pub. No.: WO2005/049204

PCT Pub. Date: Jun. 2, 2005

(65) Prior Publication Data

US 2008/0206624 A1    Aug. 28, 2008

(51) Int. Cl.
*H01M 8/10* (2006.01)
*C08J 5/22* (2006.01)

(52) U.S. Cl. .............................. 429/33; 521/25; 521/27

(58) Field of Classification Search .................. 429/33; 521/25, 27
See application file for complete search history.

(56) References Cited

U.S. PATENT DOCUMENTS 4,113,922 A    9/1978    D'Agostino et al.

(Continued)

FOREIGN PATENT DOCUMENTS

WO    WO 01/58576 A1    8/2001
WO    WO 03/006515 A1    1/2003
WO    WO 03/018654 A1    3/2003

(Continued)

OTHER PUBLICATIONS

Burton et. al., Palladium-Catalyzed Cross-Coupling of Perfluoroalkenylzince Reagents With Aryl Iodides. J. Org. Chem., 1988, vol. 53:2714-2720.

*Primary Examiner*—Stephen J. Kalafut (57) ABSTRACT

A fluorinated ion exchange polymer is prepared by grafting a monomer onto a base polymer, wherein the grafting monomer is selected from the group consisting of structure 1a, 1b and mixture thereof;

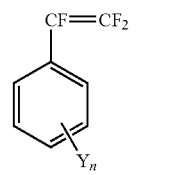

1a

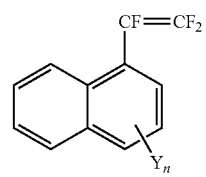

1b wherein Y is selected from the group consisting of $-R_FSO_2F$, $-R_FSO_3M$, $-R_{SO2}NH_2$ and $-R_FSO_2N(M)SO_2R^2_F$, where in M is hydrogen, an alkali cation or ammonium; and $R_F$ and $R^2_F$ are perfluorinated or partially fluorinated, and may optionally include ether oxygens; and n is between 1 and 2 for 1a, or n is between 1 and 3 for 1b. These ion exchange polymers are useful is preparing catalyst coated membranes and membrane electrode assemblies for fuel cells.

40 Claims, 2 Drawing Sheets

U.S. PATENT DOCUMENTS

| | | | |
|---|---|---|---|
| 4,169,023 A | 9/1979 | Sata et al. | |
| 4,384,941 A | 5/1983 | Okamoto et al. | |
| 4,396,727 A | 8/1983 | Ishigaki et al. | |
| 4,481,306 A | 11/1984 | Markus et al. | |
| 5,536,754 A | 7/1996 | Feiring | |
| 5,876,571 A * | 3/1999 | Buck | 521/27 X |
| 6,194,474 B1 * | 2/2001 | Kerres et al. | 521/27 |
| 6,359,019 B1 | 3/2002 | Stone et al. | |
| 6,437,011 B2 * | 8/2002 | Steck et al. | 521/27 |
| 7,179,560 B2 * | 2/2007 | Cho et al. | 429/33 |
| 2002/0137806 A1 | 9/2002 | Stone et al. | |
| 2006/0135715 A1 | 6/2006 | Yang | |
| 2006/0264576 A1 | 11/2006 | Roelofs et al. | |
| 2006/0276555 A1 | 12/2006 | Roelofs et al. | |
| 2008/0032184 A1 | 2/2008 | Yang et al. | |

FOREIGN PATENT DOCUMENTS

| | | |
|---|---|---|
| WO | WO 2004/026929 A1 | 4/2004 |
| WO | 2005/003083 A1 | 1/2005 |
| WO | WO 2005/113491 A1 | 12/2005 |
| WO | WO 2005/113621 A1 | 12/2005 |
| WO | WO 2006/102670 A1 | 9/2006 |
| WO | WO 2006/102671 A1 | 9/2006 |
| WO | WO2006/102672 A1 | 9/2006 |

* cited by examiner

TRIFLUOROSTYRENE CONTAINING COMPOUNDS, AND THEIR USE IN POLYMER ELECTROLYTE MEMBRANES

FIELD OF THE INVENTION

The present invention relates to a novel compound grafted to a base polymer, and its use in electrochemical cells as membranes, and more particularly to the use of these grafted polymers in fuel cells. This invention was made with government support under Contract No. DE-FC04-02AL67606 awarded by the U.S. Department of Energy. The government has certain rights in the invention.

BACKGROUND OF THE INVENTION

Electrochemical cells, such as fuel cells and lithium-ion batteries are known. Depending on the operating conditions, each type of cell places a particular set of requirements upon the electrolytes used in them. For fuel cells, this is typically dictated by the type of fuel, such as hydrogen or methanol, used to power the cell and the composition of the membrane used to separate the electrodes. Proton-exchange membrane fuel cells, powered by hydrogen as the fuel, could be run at higher operating temperatures than currently employed to take advantage of lower purity feed streams, improved electrode kinetics, better heat transfer from the fuel cell stack to improve its cooling. Waste heat is also employed in a useful fashion. However, if current fuel cells are to be operated at greater than 100° C. then they must be pressurized to maintain adequate hydration of typical proton-exchange membranes to support useful levels of proton conductivity.

There is an ongoing need to discover novel grafted films that improve the performance of the latest generation of electrochemical cells, such as fuel cells and lithium-ion batteries, to develop new membrane materials that will maintain adequate proton conductivity at lower levels of hydration.

SUMMARY OF THE INVENTION

In a first aspect, the invention provides a fluorinated ion exchange polymer prepared by grafting a monomer on to a base polymer, wherein the grafting monomer is selected from the group consisting of structure 1a, structure 1b and mixtures thereof:

wherein Y is selected from the group consisting of —$R_FSO_2F$ (sulfonyl fluoride), —$R_FSO_3M$ (fluorosulfonic acid or salt), —$R_FSO_2NH_2$ (fluorosulfonamide), and —$R_FSO_2N(M)SO_2R^2_F$ (imide); wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b.

In the first aspect, the invention also provides the grafting monomer further comprising co-monomers selected from the group consisting of compounds containing single or multiple vinyl groups, such as divinyl benzene, triallyl cyanurate, and monomers having the structure 2, 3 or mixtures thereof:

wherein X is hydrogen, halogen, alkyl, or perfluoroalkyl that may include oxygen.

In a second aspect, the invention provides a grafting process for making the ionic polymer comprising:
(a) forming a monomer composition comprising a grafting monomer, in neat form, emulsion form, or solution form; wherein the grafting monomer is selected from the group consisting of structure 1a, structure 1b and mixtures thereof:

wherein Y is selected from the group consisting of —$R_FSO_2F$ (sulfonyl fluoride), —$R_FSO_3M$ (fluorosulfonic acid or salt), —$R_FSO_2NH_2$ (fluorosulfonamide), and —$R_FSO_2N(M)SO_2R^2_F$ (imide); wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b;
(b) irradiating a base polymer with ionizing radiation; and
(c) contacting the base polymer with the monomer composition from step (a), at a temperature of about 0° C. to about 120° C. for about 0.1 to about 500 hrs. The steps (b) and (c) may be performed simultaneously or sequentially.

In the second aspect, the invention also provides the grafting monomers further comprising co-monomers selected from the group consisting of compounds containing single or multiple vinyl groups, such as divinyl benzene, triallyl cyanurate, and monomers having the structure 2, 3 or mixtures thereof:

2

3 wherein X is hydrogen, halogen, alkyl, or perfluoroalkyl that may include oxygen.

In a third aspect, the invention provides a catalyst coated membrane comprising a polymer electrolyte membrane, wherein the polymer electrolyte membrane comprises a fluorinated ion exchange polymer prepared by grafting a monomer on to a base polymer, wherein the grafting monomer is selected from the group consisting of structure 1a, structure 1b and mixtures thereof:

1a

1b wherein Y is selected from the group consisting of —$R_F SO_2 F$ (sulfonyl fluoride), —$R_F SO_3 M$ (fluorosulfonic acid or salt), —$R_F SO_2 NH_2$ (fluorosulfonamide), and —$R_F SO_2 N(M) SO_2 R^2_F$ (imide); wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b.

Optionally, the grafting monomers further comprise co-monomers selected from compounds containing single or multiple vinyl groups, such as divinyl benzene, triallyl cyanurate, and monomers having the structure 2, 3 or mixtures thereof:

wherein X is hydrogen, halogen, alkyl, or perfluoroalkyl that may include oxygen.

In a fourth aspect, the invention provides a membrane electrode assembly comprising a polymer electrolyte membrane, having a first surface and a second surface, wherein the polymer electrolyte membrane comprises a fluorinated ion exchange polymer prepared by grafting a monomer on to a base polymer film, wherein the grafting monomer is selected from the group consisting of structure 1a, structure 1b and mixtures thereof, 1a 1b wherein Y is selected from the group consisting of —$R_F SO_2 F$ (sulfonyl fluoride), —$R_F SO_3 M$ (fluorosulfonic acid or salt), —$R_F SO_2 NH_2$ (fluorosulfonamide), and —$R_F SO_2 N(M) SO_2 R^2_F$ (imide); wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b.

Optionally, the grafting monomers further comprise co-monomers selected from compounds containing single or multiple vinyl groups, such as divinyl benzene, triallyl cyanurate, and monomers having the structure 2, 3 or mixtures thereof:

2

-continued

3 wherein X is hydrogen, halogen, alkyl, or perfluoroalkyl that may include oxygen.

In the fourth aspect, the membrane electrode assembly further comprises at least one electrode prepared from an electrocatalyst coating composition present on the first and second surfaces of the membrane. It also further comprises at least one gas diffusion backing. Alternately, the membrane electrode assembly further comprises a gas diffusion electrode present on the first and second surfaces of the membrane, wherein the gas diffusion electrode comprises a gas diffusion backing and an electrode prepared from an electrocatalyst containing composition.

In a fifth aspect, the invention provides an electrochemical cell, such as a fuel cell, comprising a membrane electrode assembly, wherein the membrane electrode assembly comprises a polymer electrolyte membrane, having a first surface and a second surface, wherein the polymer electrolyte membrane comprises a fluorinated ion exchange polymer prepared by grafting a monomer on to a base polymer, wherein the grafting monomer is selected from the group consisting of structure 1a, structure 1b and mixtures thereof, 1a 1b wherein Y is selected from the group consisting of $-R_FSO_2F$ (sulfonyl fluoride), $-R_FSO_3M$ (fluorosulfonic acid or salt), $-R_FSO_2NH_2$ (fluorosulfonamide), and $-R_FSO_2N(M)SO_2R^2_F$ (imide); wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b.

Optionally, the grafting monomers further comprise co-monomers selected from compounds containing single or multiple vinyl groups, such as divinyl benzene, triallyl cyanurate, and monomers having the structure 2, 3, or mixtures thereof:

wherein X is hydrogen, halogen, alkyl, or perfluoroalkyl that may include oxygen.

In the fifth aspect, the fuel cell further comprises at least one electrode prepared from an electrocatalyst containing composition, e.g., an anode and a cathode, present on the first and second surfaces of the polymer electrolyte membrane. It also further comprises at least one gas diffusion backing. Alternately, the membrane electrode assembly in the fuel cell further comprises a gas diffusion electrode present on the first and second surfaces of the membrane, wherein the gas diffusion electrode comprises a gas diffusion backing and an electrode prepared from an electrocatalyst containing composition.

In the fifth aspect, the fuel cell further comprises a means for delivering a fuel to the anode, a means for delivering oxygen to the cathode, a means for connecting the anode and cathode to an external electrical load, hydrogen or methanol in the liquid or gaseous state in contact with the anode, and oxygen in contact with the cathode. The fuel is in the liquid or vapor phase. Some suitable fuels include hydrogen; alcohols such as methanol and ethanol; ethers such as diethyl ether, etc.

DETAILED DESCRIPTION OF THE INVENTION

Fluorinated Ion Exchange Polymer:
The fluorinated ion exchange polymers of the invention are useful as polymer electrolyte membranes in fuel cells, chloralkali cells, batteries, electrolysis cells, ion exchange membranes, sensors, electrochemical capacitors, and modified electrodes.

Fluorinated Sulfur-Containing Monomers:
The fluorinated ion exchange polymer is made by grafting a monomer on to a base polymer, wherein the grafting monomer is selected from the group consisting of structure 1a, structure 1b and mixtures thereof, 1a

-continued

1b wherein Y is —$R_F SO_2 F$ (sulfonyl fluoride), —$R_F SO_3 M$ (fluorosulfonic acid or salt), —$R_F SO_2 NH_2$ (fluorosulfonamide), or —$R_F SO_2 N(M) SO_2 R^2{}_F$ (imide); wherein M is H, an alkali cation, or ammonium; and $R_F$ and $R^2{}_F$ groups are perfluorinated or partially fluorinated alkylene, and may optionally include ether oxygens; and n is between 1 and 2 for 1a, or n is between 1 and 3 for 1b. Some suitable perfluorinated alkylene groups $R_F$, that may optionally include ether oxygens are selected from the group consisting of $(CF_2)_q$ wherein q=1 to 20, $(CF_2)_q OCF_2 CF_2$ wherein q=0 to 12, and $(CF_2 CF(CF_3)O)_q CF_2 CF_2$ wherein q=1 to 8. Typically $R_F$ is selected from the group consisting of $(CF_2)_q$ wherein q=1 to 4; $(CF_2)_q OCF_2 CF_2$ wherein q=0 to 6; and $(CF_2 CF(CF_3)O)_q CF_2 CF_2$ wherein q=1 to 2. $R^2{}_F$ groups typically are selected from methyl, ethyl, propyl, butyl, and phenyl, each of which may be partially fluorinated or perfluorinated. More typically $R^2{}_F$ groups are selected from the group consisting of perfluoromethyl, perfluoroethyl, and perfluorophenyl.

Typically the monomers having sulfonyl fluoride groups are represented by the structures 1a or 1b:

1a

1b

The sulfonyl fluoride groups may be converted to acid, metal salt, amide, or imide form, either before the grafting reaction or subsequent to the grafting reaction.

Synthesis of Monomers:

Monomer having structure 1 was prepared by Pd catalyzed reaction of trifluorovinyl zinc reagent with aryl bromide, which was obtained from A. Feiring (Feiring, et al, J. Fluorine Chem. 105, 129, 2000). The vinyl zinc reagent was made from reaction of $CF_2$=CFBr and zinc powder in DMF (Burton et al, JOC 53, 2714, 1988).

q = 0, 1, 2, 3 q = 0, 1, 2, 3

Co-Monomers:

The grafting monomers may optionally include co-monomers to improve the grafting process, or to improve properties such as strength or resistance to solvent swelling. Co-monomers may be introduced along with monomers having structures 1a or 1b during the grafting reaction. The co-monomers must be capable of co-polymerization with monomers 1a or 1b under free-radical conditions. Suitable crosslinking monomers comprise co-monomers selected from compounds containing multiple vinyl groups, such as divinyl benzene, triallyl cyanurate, or compounds having structure 2. Additional suitable co-monomers include substituted trifluorostyrene monomers having structure 3

2

-continued

3 wherein X is hydrogen, halogen, alkyl, or perfluoroalkyl that may include oxygen. Some suitable substituents X are hydrogen, halogen such as Cl, Br, F or I; linear or branched perfluoroalkyl groups, wherein the alkyl group comprises C1 to C10 carbon atoms; or a perfluoroalkyl group containing oxygen, chlorine or bromine, and wherein the perfluoroalkyl group comprises C1 to C10 carbon atoms. More typically, substituents X are selected from the group consisting of hydrogen, chlorine, fluorine, methyl, ethyl, methoxy, perfluoromethyl, perfluoroethyl, perfluorobutyl, perfluoromethoxy, and —$CF_2CF(CF_3)OCF_2CF_3$.

Base Polymer:

The base polymer to be used as the substrate for the grafting reaction may be a homopolymer or comprised of several comonomers. The base polymer is typically selected so that it imparts desirable mechanical properties to the final grafted polymer, is stable to the irradiation used to activate the polymer for grafting, and is stable under the conditions to which it is exposed during use. For separators or membranes it is desirable that the base polymer be present in the form of a film, though other shapes may be desired depending on the electrochemical use. Suitable materials generally include homopolymers or copolymers of non-fluorinated, fluorinated, and perfluorinated monomers. Partially or completely fluorinated polymers often impart increased chemical stability and are preferred. Some typical base polymers include poly(ethylene-tetrafluorethylene-termonomer) (ETFE) that comprises a terpolymer of ethylene and tetrafluoroethylene (TFE), in the range of 35:65 to 65:35 (mole ratios) with from 1 to 10 mole % of a termonomer, perfluorobutyl ethylene in the case of DuPont Tefzel®; ETFE copolymers also using other termonomers (Neoflon® ETFE); ECTFE that comprises a copolymer of ethylene and chlorotrifluoroethylene; FEP that comprises a copolymer of TFE and hexafluoropropylene (HFP), optionally containing a minor amount (1-3 mol %) of perfluoro(alkyl vinyl ether) (PAVE), usually perfluoro (propyl vinyl ether) (PPVE) or perfluoro(ethyl vinyl ether) (PEVE); PFA that comprises a copolymer of TFE and PAVE, wherein PAVE may be PPVE or PEVE; MFA that comprises a copolymer of TFE, PMVE, and PPVE; PTFE that comprises a homopolymer of TFE; modified PTFE, that contains up to 0.5 mol % of another monomer, usually a PAVE; PVF that comprises a polymer of vinyl fluoride (VF); PVDF that comprises a polymer of vinylidene fluoride (VF2); copolymers of VF2 and HFP which are sold under the trademarks KynarFlex® and Viton® A by Atofina and by DuPont, respectively; polyethylene and polypropylene. The term "modified" distinguishes these polymers from copolymers of TFE. The modified PTFE polymers are, like PTFE, not melt processible.

Typically, the base polymer is selected from poly(ethylene-tetrafluoroethylene), poly(ethylene-tetrafluoroethylene-termonomer) (Tefzel®, Neoflon® ETFE); poly(tetrafluoroethylene-hexafluoropropylene) (Teflon® FEP); poly (tetrafluoroethylene-perfluorovinylether) (Teflon® PFA), polytetrafluoroethylene (Teflon® PTFE); poly(ethylene-chlorotrifluoroethylene); poly(vinylidene fluoride) (Kynar® or Solef®); poly(vinylidenefluoride-hexafluoropropylene) (Kynar® Flex). More typically, the base polymer is selected from poly(ethylene-tetrafluoroethylene-termonomer), poly (tetrafluoroethylene-hexafluoropropylene), poly(tetrafluoroethylene-perfluoropropylvinylether), and poly(vinyledene fluoride).

Processes for Making Grafted Polymers and Membranes:

The fluorinated ion exchange polymer may be prepared by a grafting process comprising the steps of:

(a) forming a monomer composition comprising monomers having structures 1a or 1b, along with optional co-monomers, in neat form, emulsion form, or solution form (b) irradiating a base polymer, typically in film form, with ionizing radiation (c) contacting the base polymer with the monomer composition from step (a), at a temperature of about 0° C. to about 120° C. for about 0.1 to about 500 hrs. The steps (b) and (c) may be performed simultaneously or sequentially.

The monomers used in the grafting process are selected from monomers of 1a or 1b, along with optional co-monomers, as described above under Fluorinated Ion Exchange Polymer. Base polymers suitable for the process of the second aspect generally include homopolymers or copolymers of fluorinated or perfluorinated monomers. Partially or completely fluorinated polymers often impart increased chemical stability and are preferred. Preferably the base polymer is selected from those listed earlier.

Free radicals may be created in the base polymer in order to produce attachment sites for the grafting monomers using radiation. When the base polymer is in film form, the films are known as irradiated films. The radiation dosage should be sufficient to allow for the desired graft level to be reached, but not so high as to cause excessive radiation damage. Graft level is defined as (wt. of grafted polymer–wt. of base polymer)/(wt. of base polymer). The radiation may be provided in the form of electron beam, gamma ray, or X-rays. Electron beam irradiation is typically performed at a high dose rate that may be advantageous for commercial production. The irradiation may be done while the base polymer is in contact with the grafting monomers (simultaneous irradiation and grafting). However, if the free radicals of the base polymer are sufficiently stable, then the irradiation may be performed first and in a subsequent step the base polymer is brought into contact with the grafting monomers (post-irradiation grafting). Base polymers suitable for the post-irradiation grafting method are usually fluorinated polymers. In this case the irradiation may typically be done at sub-ambient temperatures, for example with base polymer cooled with dry ice, and it may be stored at a sufficiently low temperature to prevent decay of the free radicals prior to its use in the grafting reaction.

With some substrates, such as poly(ethylene-tetrafluoroethylene) the irradiation may be performed in the presence of oxygen or in an oxygen-free environment, and an appreciable graft level can be obtained in either case. It is preferred to perform the grafting in an inert gas, such as nitrogen or argon. This may be accomplished by loading the base polymer films, within an inert-atmosphere box, into oxygen-barrier bags, sealing them shut (with or without grafting monomers and solvent), and then irradiating. In the case of post-irradiation grafting, the base polymer may then also be stored in the oxygen-free environment before and during the grafting reaction.

The grafting reaction is performed by exposing the base polymer to a monomer composition containing the grafting monomers. In simplest form the neat liquid monomers may be used as the monomer composition. It is generally desirable to lower the quantity of fluorinated monomer used in the grafting reaction, and this may be accomplished by diluting it by forming an emulsion or a solution with a solvent, which thus increases the total working volume of the grafting composition. The monomer composition may thus be an emulsion made by mechanical or ultrasonic mixing of the monomers with water and/or alcohols such as isopropanol, and fluorinated or non-fluorinated surfactants such as fluorinated carboxylic salts, typically ammonium perfluorooctanoate and ammonium fluorooctanesulfonate. A third useful form for the monomer composition is a solution of the monomers in an inert organic solvent. Typical solvents include toluene, benzene, halobenzenes, and fluorocarbons such as perfluoroethers, fluorochlorocarbons such as 1,1,2-trichlorotrfluoroethane, chlorocarbons such as $CH_2Cl_2$, $CH_2ClCH_2Cl$, and hydrocarbons. The process for making grafted polymers by solvent grafting may also use fluoroalkyl benzene solvents. Preferred fluoroalkyl benzene solvents are trifluoromethylbenzene (α,α,α-trifluorotoluene), 1,3-bis(trifluoromethyl)benzene, and 1,4-bis(trifluoromethyl)benzene, and (pentafluoroethyl)benzene, with trifluoromethylbenzene being most preferred. We have found that aromatic compounds substituted with fluorinated aliphatic groups, when used as solvents for the fluorinated vinyl monomers, provide fast rates for grafting monomers to fluorinated base polymers. The grafting solution may comprise mixtures of the grafting monomer(s) and the solvent, where the mole fraction of the solvent in the mixture is between 1% and 99%, more typically between 5% and 90%. Grafting is accomplished by contacting the base polymer films, during irradiation or subsequent to irradiation, with the monomer composition and holding films at 0° C. to 120° C. for 0.1 to 500 hrs. Typical temperatures are 25° C. to 100° C., more typically 35 to 90° C., and most typically 40 to 80° C. Typical times are 10 min to 300 hrs, more typically 1 hr to 200 hrs, and most typically 1 hour to 100 hours. Subsequent to the grafting reaction, the solvent and unreacted monomer may be removed by extraction with a low-boiling solvent or through vaporization. The grafted polymer may also be extracted with a solvent in order to remove any polymer formed in the film that is not grafted to the base film.

Preparation of Ionic Polymers:

One of the advantages of the current invention over prior art of grafted membranes is the facile conversion of the fluorosulfonyl fluorides to acid form, without the use of sulfonation reagents. Polymers grafted with the monomers bearing pendant sulfonyl fluoride groups can be hydrolyzed with bases such as MOH or $M_2CO_3$ (M=Li, Na, K, Cs, $NH_4$) or MOH in MeOH and/or DMSO, and water. The hydrolysis is usually carried out at room temperature to 100° C., preferably at room temperature to 80° C. Treatment of polymeric salts with acids such as $HNO_3$ gave polymeric acids. With polymeric substrates such as PVDF that are sensitive to strong base, it is preferable to use the weaker carbonate bases that avoid decomposition of the substrate.

Figure 1:
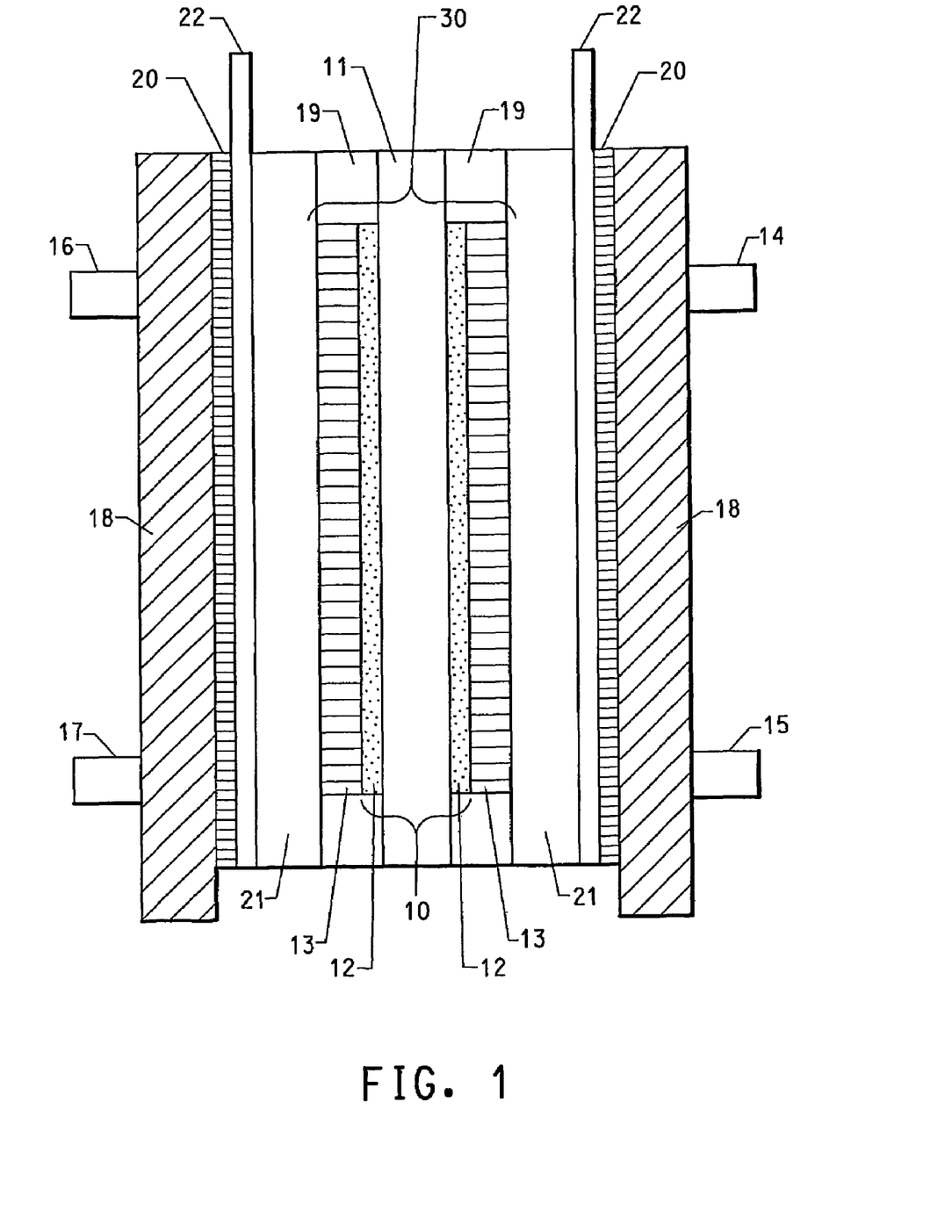
FIG. 1 is a schematic illustration of a single cell assembly.

Electrochemical Cell:

As shown in FIG. 1, an electrochemical cell, such as a fuel cell, comprises a catalyst-coated membrane (CCM) (10) in combination with at least one gas diffusion backing (GDB) (13) to form an unconsolidated membrane electrode assembly (MEA)(30). The catalyst-coated membrane (10) comprises a polymer electrolyte membrane (11) discussed above and catalyst layers or electrodes (12) formed from an electrocatalyst coating composition. The fuel cell is further provided with an inlet (14) for fuel, such as hydrogen; liquid or gaseous alcohols, e.g. methanol and ethanol; or ethers, e.g. diethyl ether, etc., an anode outlet (15), a cathode gas inlet (16), a cathode gas outlet (17), aluminum end blocks (18) tied together with tie rods (not shown), a gasket for sealing (19), an electrically insulating layer (20), graphite current collector blocks with flow fields for gas distribution (21), and gold plated current collectors (22).

Alternately, gas diffusion electrodes comprising a gas diffusion backing having a layer of an electrocatalyst coating composition thereon may be brought into contact with a solid polymer electrolyte membrane to form the MEA.

The electrocatalyst coating compositions used to apply the catalyst layers as electrodes on the CCM (10) or the GDE comprise a combination of catalysts and binders dispersed in suitable solvents for the binders, and may include other materials to improve electrical conductivity, adhesion, and durability. The catalysts may be unsupported or supported, typically on carbon, and may differ in composition depending on their use as anodes or cathodes. The binders typically consist of the same polymer used to form the polymer electrolyte membrane (11), but may contain in part or be solely composed of other suitable polymer electrolytes as needed to improve the operation of the fuel cell. Some examples include Nafion® perfluorosulfonic acid, sulfonated polyether sulfones, or their membranes.

The fuel cell utilizes a fuel source that may begin the gas or liquid phase, and may comprise hydrogen, an alcohol, or an ether. The fuel is humidified to the degree required to maintain adequate ionic conductivity in the solid polymer electrolyte membrane discussed above so that the fuel cell provides a high power output. Depending on the operating temperature, the fuel cell may be operated at elevated pressures to maintain the required degree of humidification. Typically a gaseous humidified hydrogen feed or methanol/water solution is supplied to the anode compartment, and air or oxygen supplied to the cathode compartment.

Catalyst Coated Membrane:

A variety of techniques are known for CCM manufacture, which apply an electrocatalyst coating composition similar to that described above onto a solid polymer electrolyte membrane. Some known methods include spraying, painting, patch coating and screen, decal, pad or flexographic printing.

In one embodiment of the invention, the MEA (30), shown in FIG. 1, may be prepared by thermally consolidating the gas diffusion backing (GDB) with a CCM at a temperature of under 200° C., preferably 140-160° C. The CCM may be made of any type known in the art. In this embodiment, an MEA comprises a solid polymer electrolyte (SPE) membrane with a thin catalyst-binder layer disposed thereon. The catalyst may be supported (typically on carbon) or unsupported. In one method of preparation, a catalyst film is prepared as a decal by spreading the electrocatalyst coating composition on a flat release substrate such as Kapton® polyimide film (available from the DuPont Company). After the coating dries, the decal is transferred to the surface of the SPE membrane by the application of pressure and heat, followed by removal of the release substrate to form a catalyst coated membrane (CCM) with a catalyst layer having a controlled thickness and catalyst distribution. Alternatively, the catalyst layer is applied directly to the membrane, such as by printing, and the catalyst film is then dried at a temperature not greater than 200° C.

The CCM, thus formed, is then combined with a GDB to form the MEA (30). The MEA is formed, by layering the CCM and the GDB, followed by consolidating the entire structure in a single step by heating to a temperature no greater than 200° C., preferably in the range of 140-160° C., and applying pressure. Both sides of the MEA can be formed in the same manner and simultaneously. Also, the composition of the catalyst layer and GDB could be different on opposite sides of the membrane.

The invention is illustrated in the following examples.

EXAMPLES

In-Plane Conductivity Measurement

Figure 2:
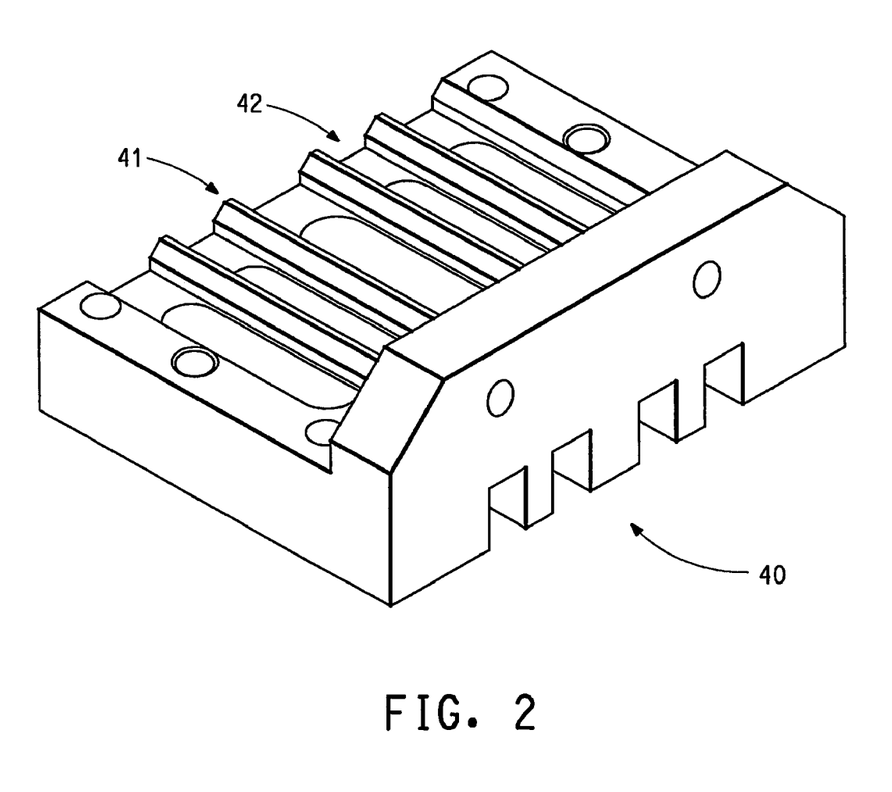
FIG. 2 is a schematic illustration of the lower fixture of a four-electrode cell for in-plane conductivity measurement.

The in-plane conductivity of membranes was measured under conditions of controlled relative humidity and temperature by a technique in which the current flowed parallel to the plane of the membrane. A four-electrode technique was used similar to that described in an article entitled "Proton Conductivity of Nafion® 117 As Measured by a Four-Electrode AC Impedance Method" by Y. Sone et al., J. Electrochem. Soc., 143, 1254 (1996), which is herein incorporated by reference. Referring to FIG. 2, a lower fixture (40) was machined from annealed glass-fiber reinforced PEEK to have four parallel ridges (41) containing grooves that supported and held four 0.25 mm diameter platinum wire electrodes. The distance between the two outer electrodes was 25 mm, while the distance between the two inner electrodes was 10 mm. A strip of membrane was cut to a width between 10 and 15 mm and a length sufficient to cover and extend slightly beyond the outer electrodes, and placed on top of the platinum electrodes. An upper fixture (not shown), which had ridges corresponding in position to those of the bottom fixture, was placed on top and the two fixtures were clamped together so as to push the membrane into contact with the platinum electrodes. The fixture containing the membrane was placed inside a small pressure vessel (pressure filter housing), which was placed inside a forced-convection thermostated oven for heating. The temperature within the vessel was measured by means of a thermocouple. Water was fed from a calibrated Waters 515 HPLC pump (Waters Corporation, Milford, Mass.) and combined with dry air fed from a calibrated mass flow controller (200 sccm maximum) to evaporate the water within a coil of 1.6 mm diameter stainless steel tubing inside the oven. The resulting humidified air was fed into the inlet of the pressure vessel. The total pressure within the vessel (100 to 345 kPa) was adjusted by means of a pressure-control letdown valve on the outlet and measured using a capacitance manometer (Model 280E, Setra Systems, Inc., Boxborough, Mass.). The relative humidity was calculated assuming ideal gas behavior using tables of the vapor pressure of liquid water as a function of temperature, the gas composition from the two flow rates, the vessel temperature, and the total pressure. Referring to FIG. 2, the slots (42) in the lower and upper parts of the fixture allowed access of humidified air to the membrane for rapid equilibration with water vapor. Current was applied between the outer two electrodes while the resultant voltage was measured between the inner two electrodes. The real part of the AC impedance (resistance) between the inner two electrodes, R, was measured at a frequency of 1 kHz using a potentiostat/frequency response analyzer (PC4/750™ with EIS software, Gamry Instruments, Warminster, Pa.). The conductivity, κ, of the membrane was then calculated as $$\kappa = 1.00 \text{ cm}/(R \times t \times w),$$

where t was the thickness of the membrane and w was its width (both in cm).

Example 1

Irradiated Films

ETFE films were obtained in thicknesses of 27 μm and 65 μm (Tefzel® LZ5100 and LZ5200, DuPont Company, Wilmington, Del.). PVdF films were obtained with a thickness 50 μm (Kynar® Goodfellow Corp, Berwyn, Pa.). The films were degassed and brought into a nitrogen-filled glove box. They were cut to size and sealed inside gas-barrier bags (ESCAL® ceramic-barrier bag from Mitsubishi Gas Chemical America, Inc. or PPD aluminum-foil-barrier bags from Shield Pack, Inc., West Monroe, La.). Dry ice pellets were placed in a metal tray for cooling and the bags with films were placed into the metal tray. The films were irradiated using an electron beam accelerator using 1 MV and a current of 2 mA. Up to 6 films were placed in each bag, and the bags were stacked up to 2 high in the tray. The beam was electronically scanned across a 40" aperture while the metal tray was moved slowly beneath the beam. Each pass resulted in a dosage of 20 kGy, and from 1 to 15 passes were used resulting in total dosages between 20 and 300 kGy. The irradiated films were stored in the bags under dry ice or in a refrigerator cooled to −40° C.

Example 2

Solvent Grafting

Irradiated films from Example 1 with 140-kGy dosage were weighed and placed inside a glass jar inside a dry box filled with nitrogen. A solution of $CF_2=CF-C_6H_4O(CF_2)_2SO_2F$ and α,α,α-trifluorotoluene (1:1 v:v) was poured over the films and a Teflon® mesh was used to hold the films under the solution. The jar was covered and heated to 60° C. for 25 hr. The films were removed from the monomer solution and rinsed briefly with α,α,α-α,α,α-trifluorotoluene. The grafted films were dried in a vacuum oven at 22° C. with nitrogen bleed for 16 hours. The films were then heated in tetrahydrofuran (THF) at 70° C. for 4 hours to further remove residual solvent, monomer, and/or polymer which was not bonded to the base film. The films were dried under ambient conditions in a fume hood, reweighed, and the uptake calculated. Uptake was calculated as $(w_g-w)/w$, where w is the initial weight of the film and $w_g$ is the weight of the dried grafted film after the THF extraction.

| Film | Initial thickness (um) | Thickness after grafting (um) | Wt uptake (%) |
|---|---|---|---|
| PVdF | 62 | 72 | 145 |
| ETFE | 27 | 39 | 257 |
| ETFE | 65 | 82 | 284 |

Example 3

Hydrolysis and Conductivity

A 65 μm ETFE film with 140-kGy dose was grafted similar to the procedure of Example 2, except the grafting time was increased to 100 hr. The grafted film had a thickness of 79 μm and a weight uptake of 236%. The film was hydrolyzed in 10 wt % KOH in H2O:MeOH:DMSO 5:4:1 wt:wt:wt in a Petri dish @ 50° C. overnight (16 hours). The film was rinsed in deionized water for 5 minutes at ambient temperature. The film was ion-exchanged to acid form by dipping in 14% nitric acid at 50° C. for 1 hr, followed by rinsing in deionized water and then three successive soaks in deionized water for 15 minutes each at 50° C. with changing to fresh water after each soak. The hydrolyzed sample was swollen to 107 μm thickness. The conductivity of the membrane was measured in-plane, as described above, immersed in water, at ambient temperature, and was found to be 159 mS/cm. The conductivity of the sample was measured in-plane at 120° C. under controlled humidity varying from 25% first to 95% at the end, after which the sample thickness had shrunk to 84 μm with also a shrinkage in the width. The conductivity values are given in the table below:

| RH % | Conductivity (mS/cm) |
|---|---|
| 25 | 31 |
| 50 | 111 |
| 95 | 511 |

Example 4

Emulsion Grafting

A 0.5 L two or three necked clean flask fitted with condenser topped with a $N_2$ inlet/outlet, and a stirring bar was charged with 100 mL of deionized water and 8.4 mL of 20% ammonium perfluorooctanoate (C8) solution. The solution was bubbled with N2 for 30 min. 15 g (42.4 mmol) of $CF_2=CFC_6H_4OCF_2CF_2SO_2F$ was added. The resulting mixture was ultrasonicated for 5 min to give milky emulsion.

Irradiated films from Example 1, with 20 kGy dosage, were weighed and placed inside a glass jar inside a dry box filled with nitrogen. The emulsion made above was transferred into the glass jar under nitrogen and a Teflon® mesh was used to hold the films under the emulsion. The jar was covered under $N_2$ and heated with stirring at 70° C. The films were removed from the jar after time specified in the Table below and washed with MeOH, acetone and water. The grafted films were dried in a vacuum oven at 70° C. with nitrogen bleed overnight and then were heated in THF at 70° C. for 4 hours to further remove residual monomer and/or polymer which was not bonded to the base film. The films were dried in a vacuum oven at 70° C. with nitrogen bleed, re-weighed, and the uptake calculated. Uptake was calculated as $(w_g-w)/w$, where w is the initial weight of the film and $w_g$ is the weight of the dried grafted film after the THF extraction.

| Film | Time (h) | Init. Weight (g) | Final Weight (g) | Wt uptake (%) |
|---|---|---|---|---|
| PVdF (1 mil) | 24 | 0.106 | 0.215 | 102.8 |
| PVdF (1 mil) | 48 | 0.111 | 0.225 | 102.7 |
| PVdF (1 mil) | 72 | 0.103 | 0.213 | 106.8 |
| ETFE (2 mil) | 24 | 0.200 | 0.393 | 96.5 |
| ETFE (2 mil) | 48 | 0.225 | 0.454 | 101.8 |
| ETFE (2 mil) | 72 | 0.216 | 0.450 | 108.3 |

Example 5

Emulsion Grafting

A 0.5 L two or three necked clean flask fitted with condenser topped with a $N_2$ inlet/outlet, and a stirring bar was charged with 100 mL of deionized water and 8.4 mL of 20% C8 solution. The solution was bubbled with $N_2$ for 30 min. 15 g (42.4 mmol) of $CF_2=CFC_6H_4OCF_2CF_2SO_2F$ were added. The resulting mixture was ultrasonicated for 5 min to give a milky emulsion.

Irradiated films from Example 1 with 40 kGy dosage were weighed and placed inside a glass jar inside a dry box filled with nitrogen. The emulsion made above was transferred into the glass jar under nitrogen and a Teflon® mesh was used to hold the films under the emulsion. The jar was covered under $N_2$ and heated with stirring at 70° C. The films were removed from the jar after certain time and washed with MeOH, acetone and water. The grafted films were dried in a vacuum oven at 70° C. with nitrogen bleed over night and then were heated in THF at 70° C. for 4 hours to further remove residual monomer and/or polymer that was not bonded to the base film. The films were dried in a vacuum oven at 70° C. with nitrogen bleed, re-weighed, and the uptake calculated. Uptake was calculated as $(w_g-w)/w$, where w is the initial weight of the film and $w_g$ is the weight of the dried grafted film after the THF extraction.

| Film | Time (h) | Init. Weight (g) | Final Weight (g) | Wt uptake (%) |
|---|---|---|---|---|
| ETFE (2 mil) | 24 | 0.237 | 0.279 | 23.2 |
| ETFE (2 mil) | 48 | 0.211 | 0.311 | 50.2 |

Example 6

Emulsion Grafting

A 0.5 L, two or three necked, clean flask fitted with condenser topped with a $N_2$ inlet/outlet, and a stirring bar was charged with 100 mL of deionized water and 8.4 mL of 20% C8 solution. The solution was bubbled with $N_2$ for 30 min. 15 g (42.4 mmol) of $CF_2=CFC_6H_4OCF_2CF_2SO_2F$ were added. The resulting mixture was ultrasonicated for 5 min to give a milky emulsion.

Irradiated films from Example 1 with 140 kGy dosage were weighed and placed inside a glass jar inside a dry box filled with nitrogen. The emulsion made above was transferred into the glass jar under nitrogen and a Teflon® mesh was used to hold the films under the emulsion. The jar was covered under $N_2$ and heated with stirring at 70° C. The films were removed from the jar after certain time and washed with MeOH, acetone and water. The grafted films were dried in a vacuum oven at 70° C. with nitrogen bleed overnight and then were heated in THF at 70° C. for 4 hours to further remove residual monomer and/or polymer which was not bonded to the base film. The films were dried in a vacuum oven at 70° C. with nitrogen bleed, reweighed, and the uptake calculated. Uptake was calculated as $(w_g-w)/w$, where w is the initial weight of the film and $w_g$ is the weight of the dried grafted film after the THF extraction.

| Film | Time (h) | Init. Weight (g) | Final Weight (g) | Wt uptake (%) |
|---|---|---|---|---|
| ETFE (1 mil) | 8 | 0.097 | 0.234 | 141.2 |
| ETFE (1 mil) | 24 | 0.116 | 0.477 | 311.2 |
| ETFE (1 mil) | 48 | 0.106 | 0.539 | 408.5 |
| ETFE (1 mil) | 72 | 0.102 | 0.520 | 409.8 |
| ETFE (1 mil) | 72 | 0.465 | 0.2.333 | 401.7 |

Example 7

Emulsion Grafting

A 0.5 L two or three necked clean flask fitted with condenser topped with a N2 inlet/outlet, a stirring bar was charged with 100 mL of deionized water and 8.4 mL of 20% C8 solution. The solution was bubbled with N2 for 30 min. 15 g (42.4 mmol) of $CF_2=CFC_6H_4OCF_2CF_2SO_2F$ were added. The resulting mixture was ultrasonicated for 5 min to give milky emulsion.

Irradiated films from Example 1 with 300 kGy dosage were weighed and placed inside a glass jar inside a dry box filled with nitrogen. The emulsion made above was transferred into the glass jar under nitrogen and a Teflon® mesh was used to hold the films under the emulsion. The jar was covered under and heated with stirring at 70° C. The films were removed from the jar after certain time and washed with MeOH, acetone and water. The grafted films were dried in. a vacuum oven at 70° C. with nitrogen bleed over night and were then heated in THF at 70° C. for 4 hours to further remove residual monomer and/or polymer which was not bonded to the base film. The films were dried in a vacuum oven at 70° C. with nitrogen bleed, reweighed, and the uptake calculated. Uptake was calculated as $(w_g-w)/w$, where w is the initial weight of the film and $w_g$ is the weight of the dried grafted film after the THF extraction.

| Film | Time (h) | Init. Weight (g) | Final Weight (g) | Wt uptake (%) |
|---|---|---|---|---|
| ETFE (2 mil) | 3 | 0.197 | 0.211 | 7.1 |
| ETFE (2 mil) | 11 | 0.244 | 0.300 | 22.9 |
| ETFE (2 mil) | 30 | 0.212 | 0.322 | 51.9 |
| ETFE (2 mil) | 55 | 0.199 | 0.555 | 178.8 |
| ETFE (2 mil) | 120 | 0.897 | 3.172 | 253.6 |

Example 8

Hydrolysis and Conductivity

A grafted 1 mil ETFE film having 141% weight gain was immersed in 10 wt % KOH in $H_2O$:MeOH:DMSO 5:4:1 wt:wt:wt in a Petri dish @ 50° C. overnight two days. The film was rinsed in deionized water for 5 minutes at ambient temperature. The film was ion-exchanged to acid form by dipping in 14% nitric acid at 50° C. for 2 hr twice, followed by rinsing in deionized water and then three successive soaks in deionized water for 15 minutes at room temperature and then boiled in water for 1 hr. The hydrolyzed sample was swollen to 36 μm thickness. The conductivity of the sample was measure in-plane at 120° C. under controlled humidity varying from 25% first to 95% at the end. The conductivity values are given in the table below:

| RH % | Conductivity (mS/cm) |
|---|---|
| 25 | 17.7 |
| 50 | 69.8 |
| 95 | 368.3 |

Example 9

Hydrolysis and Conductivity

A grafted 2 mil ETFE film having 23.2% weight gain was immersed in 10 wt % KOH in H2O:MeOH:DMSO 5:4:1 wt:wt:wt in a Petri dish @ 50° C. for two days. The film was rinsed in deionized water for 5 minutes at ambient temperature. The film was ion-exchanged to acid form by dipping in 14% nitric acid at room temperature for 2 days, followed by rinsing in deionized water and to neutral and dried in an vacuum oven at 60° C. The hydrolyzed sample was swollen to 64 μm thickness. The conductivity of the sample was measure in-plane at 120° C. under controlled humidity varying from 25% first to 95% at the end. The conductivity values are given in the table below:

| RH % | Conductivity (mS/cm) |
|---|---|
| 25 | 0.55 |
| 50 | 3.95 |
| 95 | 43.5 |

What is claimed is:

1. A fluorinated ion exchange polymer prepared by grafting a monomer on to a base polymer, wherein the grafting monomer is selected from the group consisting of structure 1a, structure 1b and mixtures thereof, wherein for 1a and 1b, Y is independently selected from the group consisting of —$R_FSO_2F$ (sulfonyl fluoride), —$R_FSO_3M$ (fluorosulfonic acid or salt), —$R_FSO_2NH_2$ (fluorosulfonamide), and —$R_FSO_2N(M)SO_2R^2_F$ (imide);

wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b.

2. The fluorinated ion exchange polymer of claim 1 wherein Y is —$R_FSO_2F$.

3. The fluorinated ion exchange polymer of claim 1 wherein $R_F$ is selected from the group consisting of $(CF_2)_q$ wherein q=1 to 20, $(CF_2)_qOCF_2CF_2$ wherein q=0 to 12, and $(CF_2CF(CF_3)O)_qCF_2CF_2$ wherein q=1 to 8, and $R^2_F$ is selected from the group consisting of methyl, ethyl, propyl, butyl, and phenyl, each of which may be partially fluorinated or perfluorinated.

4. The fluorinated ion exchange polymer of claim 3 wherein $R_F$ is selected from the group consisting of $(CF_2)_q$ wherein q=1 to 4, (CF$_2$)$_q$OCF$_2$CF$_2$ wherein q=0 to 6, and (CF$_2$CF(CF$_3$)O)$_q$CF$_2$CF$_2$ wherein q=1 to 2, and R$^2_F$ is selected from the group consisting of perfluoromethyl, perfluoroethyl, and perfluorophenyl.

5. The fluorinated ion exchange polymer of claim 1 wherein the grafting monomers further comprise co-monomers selected from the group consisting of compounds containing a single vinyl group, compounds containing multiple vinyl groups, monomers having the structure 2, monomers having structure 3 and mixtures thereof:

wherein X is hydrogen, halogen, alkyl, or perfluoroalkyl that may include oxygen.

6. The fluorinated ion exchange polymer of claim 5 wherein the compounds containing single or multiple vinyl groups are divinyl benzene or triallyl cyanurate.

7. The fluorinated ion exchange polymer of claim 5 wherein the substituents X on co-monomer of structure 3 are selected from the group consisting of hydrogen, halogen; linear or branched perfluoroalkyl groups, wherein the alkyl group comprises C1 to C10 carbon atoms; and a perfluoroalkyl group containing oxygen, chlorine or bromine, wherein the perfluoroalkyl group comprises C1 to C10 carbon atoms.

8. The fluorinated ion exchange polymer of claim 7 wherein the substituents X on co-monomer of structure 3 are selected from the group consisting of hydrogen, chlorine, fluorine, methyl, ethyl, methoxy, perfluoromethyl, perfluoroethyl, perfluorobutyl, perfluoromethoxy, and —CF$_2$CF(CF$_3$)OCF$_2$CF$_3$.

9. The fluorinated ion exchange polymer of claim 1 wherein the base polymer is a homopolymer or copolymer of non-fluorinated, fluorinated, and perfluorinated monomers.

10. The fluorinated ion exchange polymer of claim 9 wherein the base polymer is selected from the group consisting of poly(ethylene-tetrafluoroethylene), poly(ethylene-chlorotrifluoroethylene), poly(tetrafluoroethylene-hexafluoropropylene), poly(tetrafluoroethylene-perfluoroalkyl vinyl ether), poly(tetrafluoroethylene-perfluoromethyl vinyl ether), poly(tetrafluoroethylene-perfluoropropyl vinyl ether), polytetrafluoroethylene, modified polytetrafluoroethylene, polyvinyl fluoride, polyvinylidene fluoride, poly(vinylidene fluoride-hexafluoropropylene), polyethylene, and polypropylene.

11. The fluorinated ion exchange polymer of claim 10 wherein the perfluoro(alkyl vinyl ether), is perfluoro(propyl vinyl ether) or perfluoro(ethyl vinyl ether).

12. The fluorinated ion exchange polymer of claim 2 wherein the base polymer comprises a terpolymer of ethylene, tetrafluoroethylene (TFE), and 1 to 10 mole % of a termonomer such as perfluorobutyl ethylene.

13. A fluorinated ion exchange polymer membrane comprising a fluorinated ion exchange polymer prepared by
grafting a monomer on to a base polymer, wherein the grafting monomer is selected from the group consisting of structure 1a, structure 1b and mixtures thereof, wherein for 1a and 1b, Y is independently selected from the group consisting of —R$_F$SO$_2$F (sulfonyl fluoride), —R$_F$SO$_3$M (fluorosulfonic acid or salt), —R$_F$SO$_2$NH$_2$ (fluorosulfonamide), and —R$_F$SO$_2$N(M)SO$_2$R$^2_F$ (imide); wherein M is H, an alkali cation, or ammonium; and R$_F$ and R$^2_F$ groups are perfluorinated or partially fluorinated, and may optionally include ether oxygens; and n is between 1 and 2 for 1a, or n is between 1 and 3 for 1b; and wherein the base polymer is a partially or completely fluorinated polymer in film form.

14. The fluorinated ion exchange membrane of claim 13 wherein the base polymer is a completely fluorinated polymer.

15. The fluorinated ion exchange membrane of claim 13 wherein the base polymer is selected from the group consisting of poly(ethylene-tetrafluoroethylene), poly(ethylene-tetrafluoroethylene-termonomer), poly(tetrafluoroethylene-hexafluoropropylene), poly(tetrafluoroethylene-perfluorovinylether), polytetrafluoroethylene, poly(ethylene-chlorotrifluoroethylene); poly(vinylidenefluoride), and poly(vinyl idenefluoride-hexafluoropropylene).

16. The fluorinated ion exchange membrane of claim 15 wherein the base polymer is selected from the group consisting of poly(ethylene-tetrafluoroethylene-termonomer), poly(tetrafluoroethylene-hexafluoropropylene), poly(tetrafluoroethylene-perfluoropropylvinylether), and poly(vinyledene fluoride).

17. The fluorinated ion exchange membrane of claim 15 wherein the base polymer comprises a terpolymer of ethylene, tetrafluoroethylene (TFE), and 1 to 10 mole % of a perfluorobutyl ethylene.

18. A grafting process for making the fluorinated ion exchange polymer membrane comprising:
forming an monomer composition comprising a grafting monomer, in neat form, emulsion form, or solution form, wherein the grafting monomer is selected from the group consisting of structure 1a, structure 1b and mixtures thereof, wherein for for 1a and 1b, Y is independently selected from the group consisting of —$R_FSO_2F$ (sulfonyl fluoride), —$R_FSO_3M$ (fluorosulfonic acid or salt), —$R_FSO_2NH_2$ (fluorosulfonamide), and —$R_FSO_2N(M)SO_2R^2_F$ (imide); wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b;

(b) irradiating a base polymer with ionizing radiation, and (c) contacting the base polymer with the monomer composition from step (a), at a temperature of about 0° C. to about 120° C. for about 0.1 to about 500 hrs.

19. The process of claim 18 wherein the base polymer is in film form.

20. The process of claim 18 wherein steps (b) and (c) are performed simultaneously.

21. The process of claim 18 wherein steps (b) and (c) are performed sequentially.

22. The process of claim 18 wherein Y is —$R_FSO_2F$.

23. The process of claim 18 wherein $R_F$ is selected from the group consisting of $(CF_2)_q$ wherein q=1 to 20, $(CF_2)_qOCF_2CF_2$ wherein q=0 to 12, and $(CF_2CF(CF_3)O)_qCF_2CF_2$ wherein q=1 to 8, and $R^2_F$ is selected from the group consisting of methyl, ethyl, propyl, butyl, and phenyl, each of which may be partially fluorinated or perfluorinated.

24. The process of claim 23 wherein $R_F$ is selected from the group consisting of $(CF_2)_q$ wherein q=1 to 4, $(CF_2)_qOCF_2CF_2$ wherein q=0 to 6, and $(CF_2CF(CF_3)O)_qCF_2CF_2$ wherein q=1 to 2, and $R^2_F$ is selected from the group consisting of perfluoromethyl, perfluoroethyl, and perfluorophenyl.

25. The process of claim 18 wherein the grafting monomer further comprises co-monomers selected from the group consisting of compounds containing a single vinyl group, compounds containing multiple vinyl groups, monomers having the structure 2, monomers having structure 3 and mixtures thereof:

wherein X is hydrogen, halogen, alkyl, or perfluoroalkyl that may include oxygen.

26. The process of claim 25 wherein the compounds containing single or multiple vinyl groups are divinyl benzene or triallyl cyanurate.

27. The process of claim 25 wherein the substituents X on co-monomer of structure 3 are selected from the group consisting of hydrogen, halogen; linear or branched perfluoroalkyl groups, wherein the alkyl group comprises C1 to C10 carbon atoms; and a perfluoroalkyl group containing oxygen, chlorine or bromine, wherein the perfluoroalkyl group comprises C1 to C10 carbon atoms.

28. The process of claim 18 wherein the base polymer is a homopolymer or copolymer of non-fluorinated, fluorinated, and perfluorinated monomers.

29. The process of claim 28 wherein the base polymer is selected from the group consisting of poly(ethylene-tetrafluoroethylene), poly(ethylene-chlorotrifluoroethylene), poly(tetrafluoroethylene-hexafluoropropylene), poly(tetrafluoroethylene-perfluoroalkyl vinyl ether), poly(tetrafluoroethylene-perfluoromethyl vinyl ether), poly(tetrafluoroethylene-perfluoropropyl vinyl ether), polytetrafluoroethylene, modified polytetrafluoroethylene, polyvinyl fluoride, polyvinylidene fluoride, poly(vinylidene fluoride-hexafluoropropylene), polyethylene, and polypropylene.

30. The process of claim 28 wherein the base polymer is a partially or completely fluorinated polymer.

31. The process of claim 30 wherein the base polymer is selected from the group consisting of poly(ethylene-tetrafluoroethylene), poly(ethylene-tetrafluoroethylene-termonomer), poly(tetrafluoroethylene-hexafluoropropylene), poly(tetrafluoroethylene-perfluorovinylether), polytetrafluoroethylene, poly(ethylene-chlorotrifluoroethylene); poly(vinyledene fluoride), and poly(vinylidenefluoride-hexafluoropropylene).

32. A catalyst coated membrane comprising a polymer electrolyte membrane having a first surface and a second surface, wherein the polymer electrolyte membrane comprises a fluorinated ion exchange polymer prepared by grafting a monomer on to a base polymer, wherein the grafting monomer is selected from the group consisting of structure 1a, structure 1b and mixtures thereof, 1b wherein for 1a and 1b, Y is independently selected from the group consisting —$R_FSO_2F$ (sulfonyl fluoride), —$R_FSO_3M$ (fluorosulfonic acid or salt), —$R_FSO_2NH_2$ (fluorosulfonamide), or —$R_FSO_2N(M)SO_2R^2_F$ (imide); wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b.

33. The catalyst coated membrane of claim 32 wherein the base polymer is in film form.

34. The catalyst coated membrane of claim 32 further comprising at least one electrode prepared from an electrocatalyst coating composition present on the first and second surfaces of the polymer electrolyte membrane.

35. The catalyst coated membrane of claim 34 wherein the electrocatalyst coating composition comprises a catalyst and a binder.

36. The catalyst coated membrane of claim 35 wherein the binder is a perfluorosulfonic acid polymer.

37. The catalyst coated membrane of claim 32 wherein the grafting monomer further comprises co-monomers selected from the group consisting of compounds containing a single vinyl group, compounds containing multiple vinyl groups, monomers having the structure 2, monomers having structure 3 and mixtures thereof:

2

3 wherein X is hydrogen, halogen, alkyl, or perfluoroalkyl that may include oxygen.

38. A membrane electrode assembly comprising a polymer electrolyte membrane, having a first surface and a second surface, wherein the polymer electrolyte membrane comprises a fluorinated ion exchange polymer prepared by grafting a monomer on to a base polymer, wherein the grafting monomer is selected from the group consisting of structure 1a, structure 1b and mixtures thereof, 1a 1b wherein for 1a and 1b, Y is independently selected from the group consisting —$R_FSO_2F$ (sulfonyl fluoride), —$R_FSO_3M$ (fluorosulfonic acid or salt), —$R_FSO_2NH_2$ (fluorosulfonamide), or —$R_FSO_2N(M)SO_2R^2_F$ (imide); wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b.

39. An electrochemical cell comprising a membrane electrode assembly, wherein the membrane electrode assembly comprises a polymer electrolyte membrane, having a first surface and a second surface, wherein the polymer electrolyte membrane comprises a fluorinated ion exchange polymer prepared by grafting a monomer on to a base polymer, wherein the grafting monomer is selected from the group consisting of structure 1a, structure 1b and mixtures thereof, 1a 1b wherein for 1a and 1b, Y is independently selected from the group consisting —$R_FSO_2F$ (sulfonyl fluoride), —$R_FSO_3M$ (fluorosulfonic acid or salt), —$R_FSO_2NH_2$ (fluorosulfonamide), or —$R_FSO_2N(M)SO_2R^2_F$ (imide); wherein M is H, an alkali cation, or ammonium; and $R_F$ and $R^2_F$ groups are perfluorinated or partially fluorinated, and may optionally include ether oxygens; and n is between 1 and 2 for 1a, or n is between 1 and 3 for 1b.

40. The electrochemical cell of claim 39 wherein the electrochemical cell is a fuel cell.

* * * * *